June 24, 1969 R. C. ZELLER ET AL 3,451,308
RECESSING FIXTURE
Filed April 24, 1967

United States Patent Office
3,451,308
Patented June 24, 1969

3,451,308
RECESSING FIXTURE
Robert C. Zeller and Warren W. Weible, both c/o The Zeller Corporation, Fort Wayne Road, Defiance, Ohio 43512
Filed Apr. 24, 1967, Ser. No. 633,201
Int. Cl. B23c 7/00, 3/00; B23b 3/28
U.S. Cl. 90—15    3 Claims

ABSTRACT OF THE DISCLOSURE

A recessing fixture for a machine tool, comprising a base mounted on the end feed tool slide of the machine tool, a tool support which is mounted on the base by means of a pair of parallel links that are pivoted both to the tool support and to the base, and which is resiliently held against a stop that arrests forward movement of the tool support relative to the base, and a stop rod which provides a lost motion connection between the tool support and the machine tool, to limit the forward movement of the tool support while the base continues to move forward with the end feed tool slide and to cause the parallel links to pivot relative to the base, thereby causing the tool support to move at an angle to the direction of movement of the base.

Background of the invention

The invention relates to a recessing fixture for use on a machine tool to feed a tool at an angle to the main direction of feed.

A recessing fixture for a machine tool is a fixture that permits a tool to be moved longitudinally toward the work and then laterally into the work to make an undercut or recess, for example to cut a circumferential groove.

A recessing fixture normally is mounted on the end feed tool slide of a machine tool, so that the advancing of the end feed tool slide moves the recessing fixture longitudinally toward the work. A common type of recessing fixture consists of a base which is mounted on the end feed tool slide, and which is provided with ways, extending at an acute angle to the direction of movement of the tool slide, in which a tool support is slidably mounted. The tool support has a lost-motion connection with the main frame of the machine, by means of a longitudinally extending rod.

In the operation of this common form of recessing fixture, during the initial forward movement of the end feed tool slide of the machine tool, the base of the fixture and the tool support travel together as a unit. Then as soon as the lost motion provided by the stop rod has been taken up, the stop rod arrests the forward movement of the tool support. Thereafter as the forward movement of the tool slide and the base of the fixture continues, the stop rod prevents further forward movement of the tool support. Thus in order that the base of the fixture may continue its forward movement while the tool support is no longer moving forward, the tool support slides in the angled ways in which it is mounted in the base of the fixture.

The result of this series of movements is that the tool support first moves straight forward with the base of the fixture until the forward movement of the tool support is arrested by the stop rod, and thereafter the tool support moves only laterally as it slides in its ways, while the base of the fixture continues to move forward. In this way a tool that is mounted on the tool support is first moved longitudinally to the proper position, and then is moved laterally into the work.

This known type of recessing fixture has two important disadvantages. One disadvantage is that the movement of the tool holder consists first of purely forward motion and then of purely lateral motion, so that no diagonal feeding movement of the tool support is possible.

Another disadvantage of this known type of recessing fixture is that the ways in which the tool support is mounted in the base of the fixture are difficult to keep clean and are subject to wear, and it is difficult to keep the ways in adjustment so as to provide the desired precise movement of the tool support.

Summary of the invention

The present invention provides a recessing fixture in which precise control over the movement of the tool support is readily maintained, and in which the tool support can be fed at any desired angle to the direction of movement of the end feed tool slide on which the base of the fixture is mounted.

More specific objects and advantages are apparent from the following description, in which reference is had to the accompanying drawings, disclosing preferred embodiments of the invention.

These specific drawings and the specific description that follows are intended to disclose and illustrate and not to limit the invention.

Description of the preferred embodiments

Figure 1:
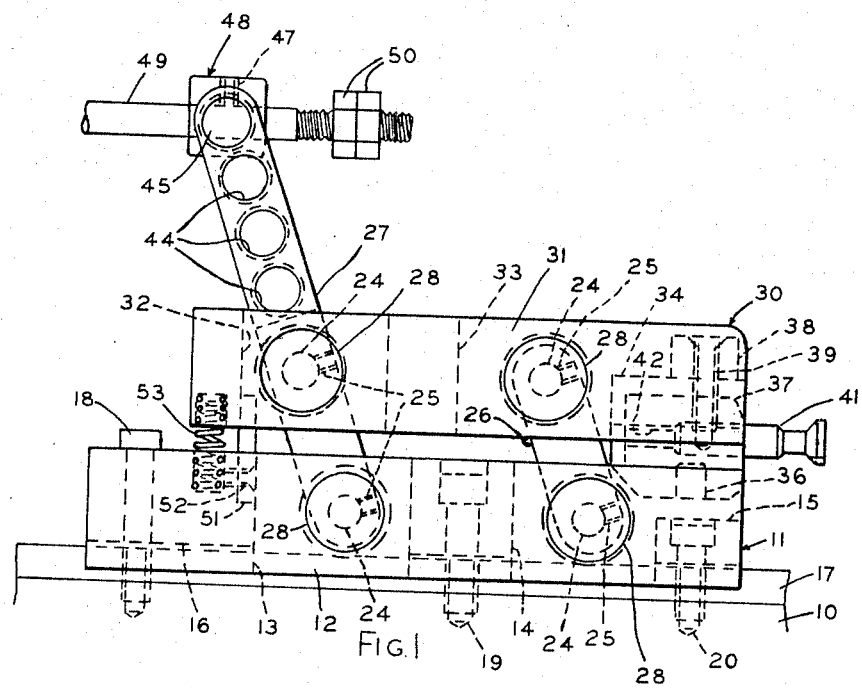
FIG. 1 of the drawings is a side elevation of a recessing fixture embodying the invention.
Figure 2:
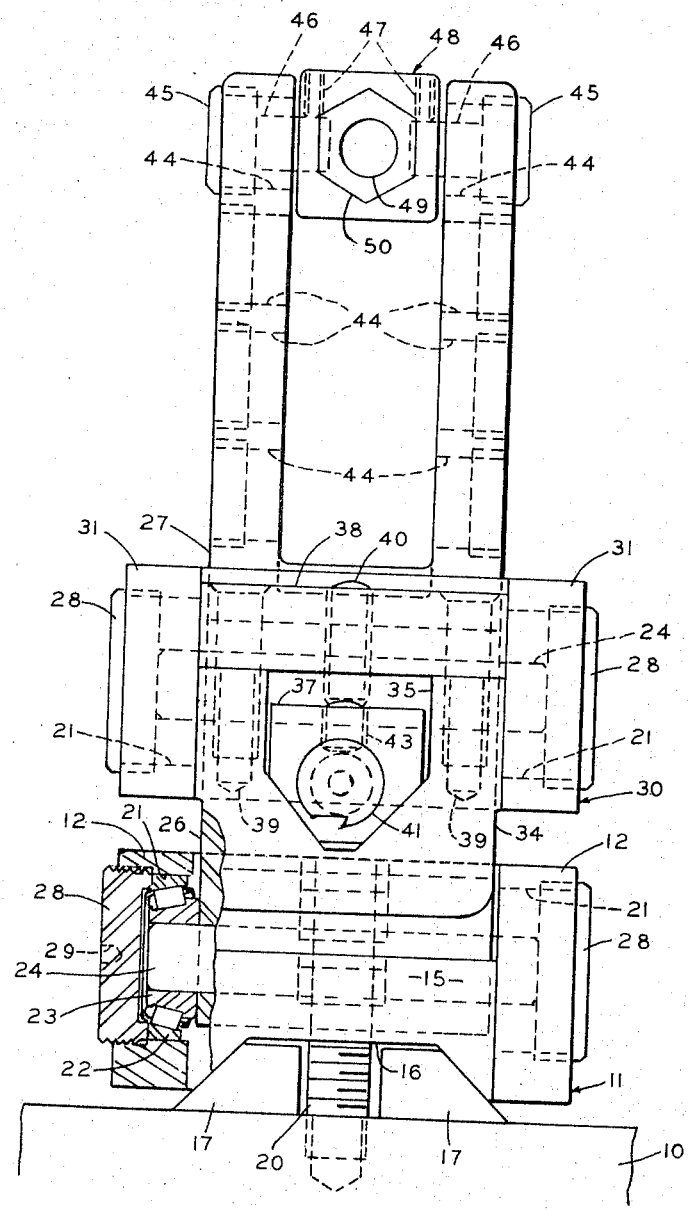
FIG. 2 is a front elevation of the recessing fixture on a larger scale.

The recessing fixture shown in FIGS. 1 and 2 is capable of feeding a tool at an acute angle to the main direction of feed, in contrast to the known recessing fixtures which are only capable of feeding a tool at an angle of 90° to the main direction of feed.

Although a fixture embodying the present invention may be used to feed a rotating tool, such as a milling cutter, the drawings for purposes of simplicity of illustration show a fixture for feeding a stationary cutting tool, i.e., a nonrotating cutting tool of the type used on a lathe. The present invention is particularly useful when applied to a multiple spindle automatic machine of the lathe type, such as a multiple spindle bar machine. In such a machine, several work-holding spindles are rotated simultaneously, a different machining operation being performed at each spindle position. When the simultaneous machining operations have been completed, the spindles are indexed to bring each workpiece to the next working position, and the simultaneous machining operations are repeated. In this way, each workpiece is subjected to several successive machining operations and then is cut off and ejected from the machine.

A recessing fixture embodying the invention, of the type shown in the drawings, may be used on any machine tool that is provided with an end feed tool slide for feeding a tool endwise toward the work.

The fixture shown in FIG. 1 is secured to an end feed tool slide 10 which is adapted to be fed either automatically or manually in a direction parallel to the axis of rotation of the work-holding spindle of a lathe type machine.

The base 11 of the fixture shown in FIGS. 1 and 2 consists of a pair of side plates 12 between which are welded three cross pieces 13, 14 and 15. Each of the cross pieces 13, 14 and 15 is provided on its lower side with a wide longitudinal groove 16 having inclined sides which rest upon the inclined sides of a pair of mounting rails 17 that are fixed to the surface of the tool slide 10. Such mounting of the cross pieces of the base 11 upon the longitudinal mounting rails 17 insures that the base 11 will be precisely aligned with the axis of rotation of the work-holding spindle.

The cross pieces 13, 14 and 15 of the base 11 are fixed in position upon the mounting rails 17 by means of three screws 18, 19 and 20 which are tapped into the tool slide 10 or may be fastened by T nuts in a T-type slot, in the manner that is well known in the art of attaching tool holders to slides.

Each of the side plates 12 of the base 11 is provided with two bores 21, and the outer race 22 of a conventional tapered roller bearing is slidably carried in each of the bores 21. The inner race 23 of each tapered roller bearing is secured upon one end of a trunnion shaft 24. Each trunnion shaft 24 is fixed by means of a set screw 25 in one of two parallel links 26 and 27.

A cap 28 is threaded into the outer end of each of the bores 21, and is provided with suitable sockets 29 so that the cap can be rotated by means of a spanner wrench. Each of the caps 28 bears against the outer surface of one of the outer bearing races 22. Thus the caps 28 may be used to tighten up the tapered roller bearings in the initial assembly of the fixture or in take up after wear has taken place. The caps 28 seal the tapered roller bearings from the outside, and suitable covers may be provided to seal the inner ends of the bearings if desired.

The tool support 30 in the present fixture includes a pair of side plates 31 between which are welded three cross pieces, 32, 33 and 34.

The tool support 30 is pivotally secured to the parallel links 26 and 27. For that purpose, each of the side plates 31 of the tool support is provided with two bores 21 containing tapered roller bearings for supporting the ends of a trunnion shaft 24 carried by each of the parallel links 26 and 27. A cap 28 is threaded into each of the bores 21 in the side plates 31 of the tool support 30. The structures of the bearings by means of which the plates 31 are connected to the parallel links 26 and 27 is identical to the bearing structure by means of which the side plates 12 of the base 11 are connected to the parallel links.

Because of these tapered roller bearings by means of which the parallel links are pivoted to the base 11 and to the tool support 30, the tool support 30 may be maintained in precise alignment at all times, and all play in the mounting of the tool support upon the parallel links may be eliminated.

The pivots by means of which the tool support in the present fixture is movably supported on the base also remain much more free from abrasive metal particles than the ways in which the tool support in the known type of recessing fixture was slidably supported on the base of the fixture.

As shown in FIGS. 1 and 2, the front cross piece 34 of the tool support 30 is substantially U-shaped and extends across only the lower half of the tool support but depends substantially below the bottom of the tool support. This front cross piece 34 has a longitudinally extending saddle-shaped opening 35 in its upper side, as shown in FIG. 2, and the bottom of the saddle-shaped opening 35 is substantially V-shaped.

As shown in FIG. 1, a hole 36 is drilled in the bottom of the saddle-shaped opening 35, so that a tool may be inserted through the hole 36 in order to turn the screw 20.

A tool holder 37 is seated in the saddle-shaped opening 35 of the front cross piece 34. The lower side of the tool holder 37 is V-shaped, to fit the V-shaped bottom of the saddle-like opening 35, in order that the tool holder 37 may be precisely positioned and aligned in the tool support 30.

A cross bar 38 is secured to the upper surface of the front cross piece 34 by means of two screws 39, and a set screw 40 threaded through the cross bar 38 bears against the top of the tool holder 37 for the purpose of fixing the tool holder 37 in the proper position.

A cutting tool 41 has its cylindrical body portion fitted precisely in a cylindrical bore which extends longitudinally into the front face of the tool holder 37. The cylindrical bore which receives the cutting tool 41 may be connected to a smaller passage 42 which extends to the rear face of the tool holder 37 to permit passage of air when the cutting tool 41 is being inserted in or removed from the tool holder 37.

A set screw 43, located somewhat in front of the set screw 40 and shown in FIG. 2, is used to fix the cutting tool 41 in the proper position in the tool holder 37.

In order to obtain the proper cutting action, it is necessary that the axis of the cutting tool 41 be offset horizontally from the axis of the work-holding spindle of the machine tool. As seen in FIG. 2, the tool 41 is offset toward the left from the spindle axis.

In the known fixtures, the tool holder is provided with an eccentric mounting for the tool so that whenever a new tool is inserted, the eccentric mounting can be adjusted to provide the necessary offset between the axis of the tool and the spindle axis.

In the present fixture, however, the tool holder 37 provides the proper precise positioning of the tool axis whenever a new or resharpened tool is inserted in the tool holder, and no adjustment of the tool axis is necessary.

The present tool holder 37 positions the tool with its axis offset from the spindle axis. However, in the initial setup of the fixture, the tool holder 37 is replaced, for gauging purposes, with a temporary tool holder which is identical with the tool holder 37 except that it positions the axis of the tool in precise alignment with the spindle axis. With this temporary tool holder in place, the alignment of the fixture can be gauged precisely to insure that the fixture is in proper alignment with the spindle axis. After the initial gauging and alignment of the fixture has been completed, the temporary tool holder is replaced by the tool holder 37 which positions the tool axis in a position that is parallel to but horizontally offset from the spindle axis.

In the fixture shown in FIGS. 1 and 2, the link 27 includes a portion that extends upward above the tool support 30, and this upward extending portion of the link 27 is in the form of a fork. The two prongs of this forked upward extension of the link 27 are provided with four pairs of aligned bores 44. The bores 44 are threaded at their outer ends to receive a threaded cap 45 which is similar to the threaded cap 28.

Only two of the threaded caps 45 are provided, and these two threaded caps are employed to retain in two aligned bores 44 a pair of tapered roller bearings which may be identical in construction to the tapered roller bearings that are retained by the threaded caps 28.

The tapered roller bearings which are retained by the two threaded caps 45 serve to support a pair of trunnions 46 which are fixed by means of set screws 47 in a block 48. The block 48 is provided with a longitudinally extending bore which slidably receives a stop rod 49 on which are threaded a pair of stop nuts 50.

The stop rod 49 is of substantial length, and the remote end of the stop rod is fixed to the frame of the machine tool.

In order to arrest forward movement of the tool support 30 relative to the base 11, a stop 51 is provided in the form of a plate which is set into the upper front corner of the cross piece 13, to which it is secured by screws 52. Forward movement of the tool support 30 relative to the base 11 is arrested when the cross piece 32 of the tool support 30 comes into contact with the stop 51. Vertical springs 53 set into sockets formed in the top of the cross piece 13 and in the bottom of the cross piece 32 function to hold the tool support 30 resiliently against the stop 51.

In the operation of the recessing fixture shown in FIGS. 1 and 2, the tool slide 10 moves forward in the usual manner, parallel to the axis of the work-holding spindle, in order to bring the tool 41 into position to perform a lathe-type machining operation. Then when the cutting tool 41 has reached a position at which it is ready to begin cutting a groove in the work, the block 48 contacts the stop nuts 50 on the fixed stop rod 49, thus preventing further forward movement of the block 48. Then as the tool slide 10 continues to move forward, carrying with it the base 11 of the fixture, the contact of the block 48 against the stop nuts 50 prevents the upper end of the link 27 from moving forward, so that the link 27 begins to pivot relative to the base 11 as the base 11 continues to move forward with the tool slide 10.

In thus pivoting relative to the base 11, the link 27 acts as a lever to displace the tool support 30 relative to the base 11, thus moving the cross piece 32 away from the stop 51 and compressing the springs 53. This movement of the tool support 30 relative to the base 11 is precisely guided by the pivoted parallel links 26 and 27.

Because of the fact that the block 48 and the upper end of the link 27 are prevented from moving forward while the base 11 continues to move in a direction parallel to the axis of the work-holding spindle, the resulting movement of the tool support 30 is both forward and downward, and thus is in a direction that is oblique to the axis of the work-holding spindle. The various bores 44 are provided to permit the block 48 with its bearings to be installed in any one of four different positions. Whenever the block 48 is installed at a position lower than the position in which it is shown in FIGS. 1 and 2, the stop rod 49 must be secured to the frame in a corresponding lower position so that the stop rod 49 will be horizontal. Thus provision must be made for securing the remote end of the stop rod 49 at various levels on the frame of the machine tool, corresponding to the various levels of the bores 44.

When the block 48 and its bearings are assembled in the highest pair of bores 44, as shown in FIGS. 1 and 2, the final feeding movement of the tool 41 is at the most acute angle to the horizontal. (For the purposes of this discussion, it is assumed that the axis of the work-holding spindle is horizontal.) When the block 48 and its bearings are assembled with a lower pair of the bores 44, the final feeding movement of the tool 41 is at a less acute angle to the horizontal.

Figure 3:
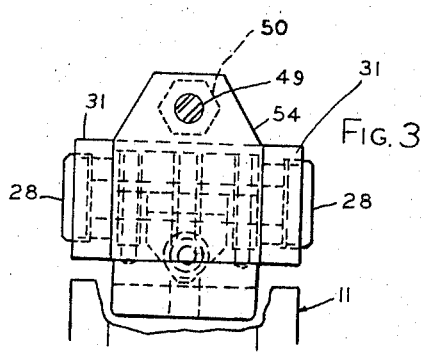
FIG. 3 is an elevation of the opposite end of the recessing fixture, showing an alternative construction.

FIG. 3 shows a modified construction in which the final feeding movement of the tool is at an angle of substantially 90° to the horizontal.

The construction shown in FIG. 3 is identical with the construction shown in FIGS. 1 and 2, except that in the construction of FIG. 3 the link 27 and cross piece 32 are replaced by slightly modified parts. The construction shown in FIG. 3 contains, instead of the link 27, a link which is identical with the front link 26 and does not have any upward extension.

FIG. 3, which is an elevational view of the rear end of the fixture, shows that the rear cross piece 32 has been replaced by a cross piece 54 which is identical with the cross piece 32 except that the cross piece 54 includes an upward extension which projects above the tops of the side rails 31.

In this case, the stop rod 49 is slidable in a bore provided in the upward-extending cross piece 54. Then as the base 11 of the fixture shown in FIG. 3 moves forward with the tool slide, the upward-extending cross piece 54 comes into contact with the stop nuts 50 on the front end of the stop rod 49.

The operation of the fixture shown in FIG. 3 is the same as the operation of the fixture shown in FIGS. 1 and 2, except that during the forward movement of the base 11, the forward movement of the tool support is completely terminated as soon as the cross piece 54 comes into contact with the stop nuts 50. Thereafter, as the forward movement of the base 11 continues, the parallel links swing in their pivots, but the tool support of FIG. 3 cannot move forward and therefore moves at an angle of substantially 90° to the direction of movement of the base 11.

In the operation of both of the types of fixtures shown in the drawings, the amount of movement of the tool support after the stop nuts 50 have been contacted is relatively small, being only sufficient to provide the desired depth of cut. Then since the stop rod 49 is relatively long, the remote end of the stop rod 49 may be rigidly fixed to the frame of the machine tool, because the necessary lateral movement of the stop nuts 50, as the tool support pivots on the parallel links will cause only slight bending of the stop rod 49. During such bending of the stop rod 49, the stop nuts 50 actually travel in an arcuate path rather than in a vertical path. However, the movement of the stop nuts 50 is so small that for all practical purposes it may be considered to be vertical.

During the return movement of the tool slide and the base 11, the initial movement of the tool support is controlled by the springs 53 and the stop 51 which are present in the fixture of FIG. 3 although they are not shown in that figure. As the base 11 begins its backward movement after the cutting operation has been completed, the springs 53 hold the block 48 or the cross piece 54 in contact with the stop nuts 50 while he parallel links swing toward a more vertical position. Then when the cross piece 32 or 54 comes into contact with the stop 51, the pivoting of the parallel links is arrested, and the further backward movement of the base 11 causes the block 48 or the cross piece 54 to leave the stop nuts 50 and to move backward along the stop rod 49.

Thus the return movement of the tool retraces exactly the path followed by the tool during its forward feeding movement. In this way, the tool is moved upward out of a groove that has been cut by the tool before the tool is moved backward away from the work.

Although the drawings show the fixture only in an upright position, it is to be understood that it is often necessary to secure the fixture to the side or to the bottom of the tool slide rather than to the upper surface of the tool slide.

Also the present fixture, which has been described in its application to a horizontal tool slide, may be used with a vertical or inclined tool slide.

Various other modifications of the present fixture may be devised to meet various requirements.

Having described the invention, we claim:

1. A recessing fixture for use on a machine tool to feed a tool at an angle to the main direction of feed, comprising a base adapted to be mounted on an end feed tool slide of the machine tool, wherein the improvement comprises a tool support, a pair of parallel links by means of which the tool support is mounted on the base, each link being pivoted both to the tool support and to the base, a stop for arresting forward movement of the tool support relative to the base, the tool support being resiliently held against such stop, and a stop rod connected to the tool support which provides a lost motion connection between the tool support and the machine tool, to limit the forward movement of the tool support while the base continues to move forward with the end feed tool slide, and to cause the parallel links to pivot relative to the base, thereby causing the tool support to move at an angle to the direction of movement of the base.

2. A recessing fixture according to claim 1 wherein one of the parallel links is provided with an extension projecting beyond the pivotal connection of the link with the tool support, and the stop rod is connected to such extension so that the angular movement of the tool support is oblique to the direction of movement of the base.

3. A recessing fixture according to claim 1 wherein each link is pivoted to the base and to the tool support in tapered roller bearings.

References Cited

UNITED STATES PATENTS 2,837,941   6/1958   Schlitters.

FOREIGN PATENTS 701,152   12/1949   Great Britain.

LEONIDAS VLACHOS, *Primary Examiner.*

U.S. Cl. X.R.

77—58; 82—11, 24